Jan. 5, 1971  A. H. SHOEMAKER  3,552,831
THREE MEMBER MICROSCOPE OBJECTIVE HAVING A MAGNIFICATION OF 40X
Filed Dec. 9, 1968
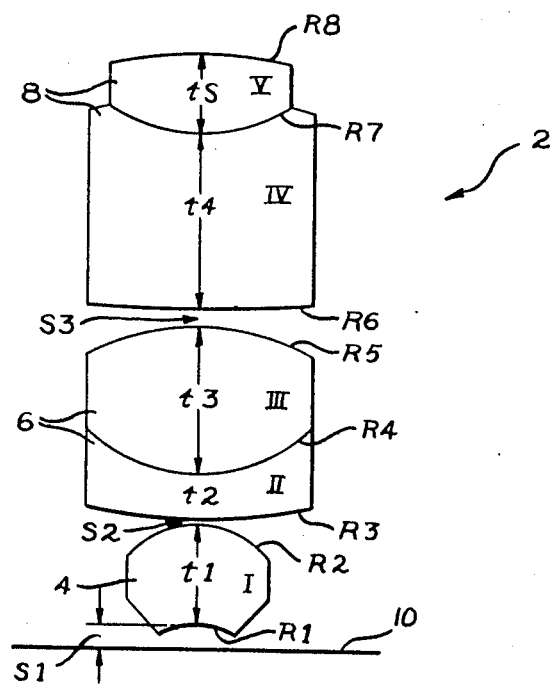
INVENTOR.
ARTHUR H. SHOEMAKER
BY
ATTORNEY

3,552,831
THREE MEMBER MICROSCOPE OBJECTIVE HAVING A MAGNIFICATION OF 40×

Arthur H. Shoemaker, East Aurora, N.Y., assignor to American Optical Corporation, Southbridge, Mass., a corporation of Delaware
Filed Dec. 9, 1968, Ser. No. 782,270
Int. Cl. G02b 9/12, 21/02
U.S. Cl. 350—176  2 Claims

ABSTRACT OF THE DISCLOSURE

A three member microscope objective having a numerical aperture of substantially 0.66 and a magnification of substantially 40×.

BACKGROUND OF THE INVENTION

The present invention relates to a microscope objective. An object of the present invention is to provide an achromatic microscope objective having a numerical aperture of substantially 0.66 and a magnification of substantially 40×, in which chromatic and spherical aberrations, coma, and astigmatism are well corrected while yet providing a substantially flat image field, when used with a telescope objective as described in U.S. Pat. No. 3,355,234.

Drawing

In the drawing, a microscope objective is represented by a plurality of lenses viewed transversely to their axis.

Description

Referring now to the drawing, a microscope objective is generally shown at 2. It includes a front single lens 4, a doublet 6, and a doublet 8, all of the said lenses being in axial alignment. Objective 2 is disposed relative to an object plane 10 as shown in the drawing.

Lens 4, also designated as I, is a single concavo-convex lens. Doublet 6 includes a convex-concavo lens II and a double convex lens III, together forming a double convex doublet. Doublet 8 includes a convex-concavo lens IV and a double convex lens V, together forming a double convex doublet.

The lens parameters are as follows: The successive lens radii are designated R1–R8, where a minus sign indicates radii of centers of curvature lying on the object side of their vertices. The axial thicknesses of successive lens elements are designated T1–T5. The successive axial spaces from the object plane 14 are designated S1–S3. The refractive indices of the successive lens elements are designated ND1–ND5. The Abbe numbers of the successive lens glasses are designated $\gamma 1$–$\gamma 5$, respectively.

The above-mentioned parameters are related to the focal length according to the following constructional data:

[Magnification=40×; N.A.=0.66]

| Lens | Radius, R | Thickness, T | Space, S | Refractive index, ND | Abbe number $\gamma$ |
|---|---|---|---|---|---|
| I | R1=−.6213F<br>R2=−.7305F | T1=.8083F | S1=.1568F<br>S2=.0469F | ND1=1.78832 | $\gamma 1$=50.47 |
| II | R3=4.2930F<br>R4=1.2570F | T2=.3336F | | ND2=1.78446 | $\gamma 2$=25.75 |
| III | R5=−1.8601F | T3=1.1371F | S3=.1388F | ND3=1.69680 | $\gamma 3$=55.68 |
| IV | R6=9.4364F<br>R7=1.3531F | T4=1.3136F | | ND4=1.30785 | $\gamma 4$=40.72 |
| V | R8=−3.2754F | T5=.5853F | | ND5=1.47063 | $\gamma 5$=67.33 |

The foregoing parameters of radius, thickness and space are based on the value of F. The value of F in this case as an example, is 4.56. Given in numbers, the foregoing data is as follows:

[F=4.56; Magnification=40×; N.A.=0.66]

| Lens | Radius, R | Thickness, T | Space, S | Refractive Index, ND | Abbe number $\gamma$ |
|---|---|---|---|---|---|
| I | R1=−2.833<br>R2=−3.331 | T1=3.686 | S1=.724<br>S2=.214 | ND1=1.78832 | $\gamma 1$=50.47 |
| II | R3=19.580<br>R4=5.732 | T2=1.521 | | ND2=1.78446 | $\gamma 2$=25.75 |
| III | R5=−8.482 | T3=5.185 | S3=.633 | ND3=1.69680 | $\gamma 3$=55.68 |
| IV | R6=43.030<br>R7=6.170 | T4=5.990 | | ND4=1.30785 | $\gamma 4$=40.72 |
| V | R8=−14.936 | T5=2.669 | | ND5=1.47063 | $\gamma 5$=67.33 |

It will be apparent that the foregoing absolute values are variable depending on the value of F. Other forms the thus possible and changes may be made in the values of the constructional data based on the relationships in the first of the above charts, without departing from the spirit of this invention.

What is claimed is:

1. An achromatic microscope objective having a magnification of substantially 40× and a numerical aperture of substantially 0.66 for forming an image of an object plane, said image being well corrected for spherical and chromatic aberrations, coma, astigmatism and curvature of image field, said objective comprising:
   a front concavo-convex singlet lens member I;
   a second convex-concavo lens member II;
   a third double convex lens member III;
   said second and third members forming a doublet;
   a fourth convex-concavo lens member IV;
   a fifth double convex lens member V;
   said fourth and fifth members forming a doublet;
   all of said lens members being axially aligned; and
   the parameters of lens radii (R1–R8), lens thicknesses (T1–T5), axial spaces among lens elements and object plane (S1–S3), refractive indices (ND1–ND5), and Abbe numbers (γ1–γ5), being determined by the following relationship:

[Magnification=40×; N.A.=0.66]

| Lens | Radius, R | Thickness, T | Space, S | Refractive index, ND | Abbe number γ |
|---|---|---|---|---|---|
| I | R1=−.6213F | T1=.8083F | S1=.1588F | ND1=1.78833 | γ1=50.47 |
|   | R2=−.7305F |   | S2=.0469F |   |   |
| II | R3=4.2939F | T2=.3336F |   | ND2=1.78446 | γ2=25.75 |
| III | R4=1.2570F | T3=1.1371F |   | ND3=1.60669 | γ3=55.68 |
|   | R5=−1.8601F |   |   |   |   |
| IV | R6=9.4364 | T4=1.3136F | S3=.1368F | ND4=1.80785 | γ4=40.72 |
| V | R7=1.3521F | T5=.5853F |   | ND5=1.47063 | γ5=67.33 |
|   | R8=−3.2754F |   |   |   |   | wherein scalar values are given in millimeters.

2. An achromatic microscope objective having a magnification of substantially 40× and a numerical aperture of substantially 0.66 for forming an image of an object plane, said image being well corrected for spherical and chromatic aberrations, coma, astigmatism and curvature of image field, said objective comprising:
   a front convaco-convex lens member I;
   a second convex-concavo lens member II;
   a third double convex lens member III;
   said second and third members forming a doublet;
   a fourth convex-concavo lens member IV;
   a fifth double convex lens member V;
   said fourth and fifth members forming a doublet;
   all of said lens members being axially aligned; and
   the parameters of lens radii (R1–R8), lens thicknesses (T1–T5), axial spaces among lens elements and object plane (S1–S3), refractive indices (ND1–ND5), and Abbe numbers (γ1–γ5) as follows:

[F=4.56; Magnification=40×; N.A.=0.66]

| Lens | Radius, R | Thickness, T | Space, S | Refractive Index, ND | Abbe number γ |
|---|---|---|---|---|---|
| I | R1=−2.833 | T1=3.686 | S1=.724 | ND1=1.78833 | γ1=50.47 |
|   | R2=−3.331 |   | S2=.214 |   |   |
| II | R3=19.580 | T2=1.521 |   | ND2=1.78446 | γ2=25.75 |
| III | R4=5.732 | T3=5.185 |   | ND3=1.60669 | γ3=55.68 |
|   | R5=−8.482 |   | S3=.633 |   |   |
| IV | R6=43.030 | T4=5.990 |   | ND4=1.80785 | γ4=40.72 |
| V | R7=6.170 | T5=2.669 |   | ND5=1.47063 | γ5=67.33 |
|   | R8=−14.936 |   |   |   |   | wherein scalar values are given in millimeters.

References Cited

UNITED STATES PATENTS 3,437,398  4/1969  Muller et al. _____ 350—225X

JOHN K. CORBIN, Primary Examiner

U.S. Cl. X.R.

350—225